Figure 1:
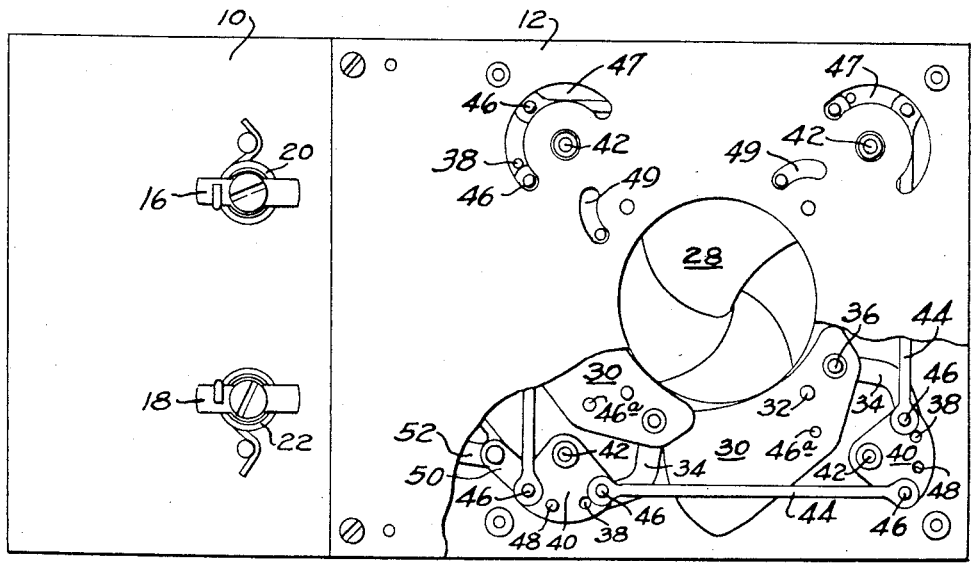

March 24, 1959      F. P. WILLCOX      2,878,735
CAMERA SHUTTER HAVING TWO SETS OF BLADES
Original Filed Nov. 4, 1949      3 Sheets-Sheet 1

INVENTOR:
Frederick P. Willcox,
BY Homer R. Montague
ATTORNEY

March 24, 1959     F. P. WILLCOX     2,878,735
CAMERA SHUTTER HAVING TWO SETS OF BLADES
Original Filed Nov. 4, 1949     3 Sheets-Sheet 2

INVENTOR:
Frederick P. Willcox
BY Homer R. Montague
ATTORNEY

March 24, 1959 — F. P. WILLCOX — 2,878,735
CAMERA SHUTTER HAVING TWO SETS OF BLADES
Original Filed Nov. 4, 1949 — 3 Sheets-Sheet 3
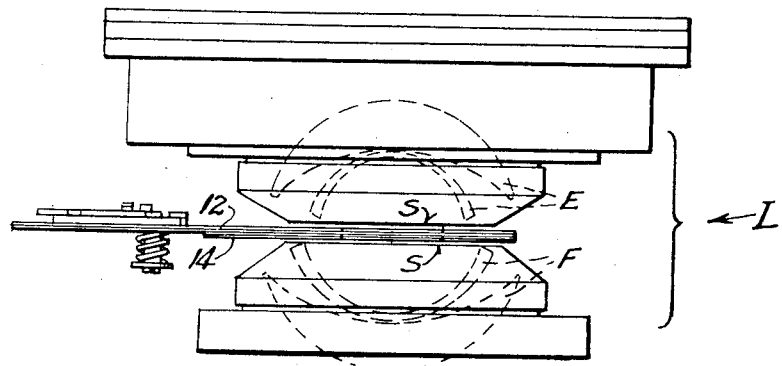
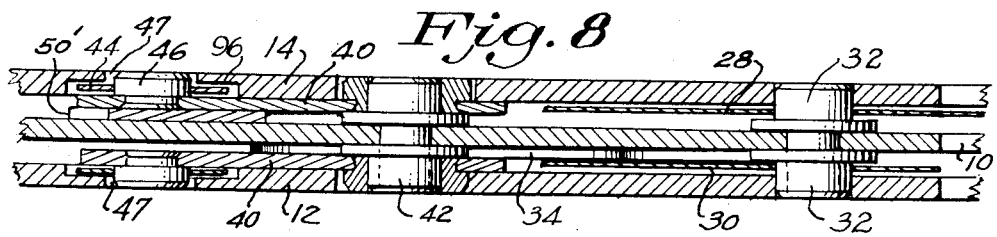
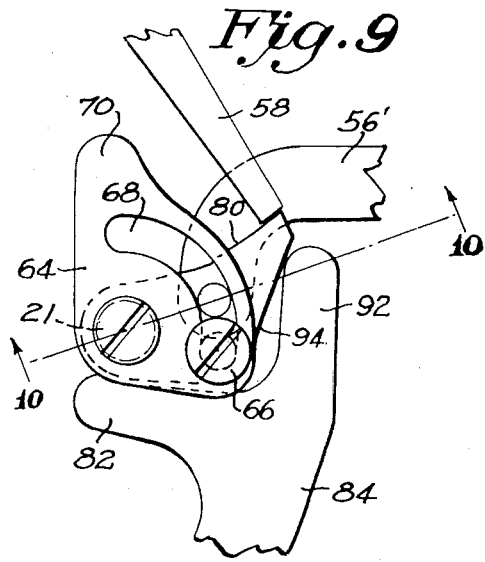
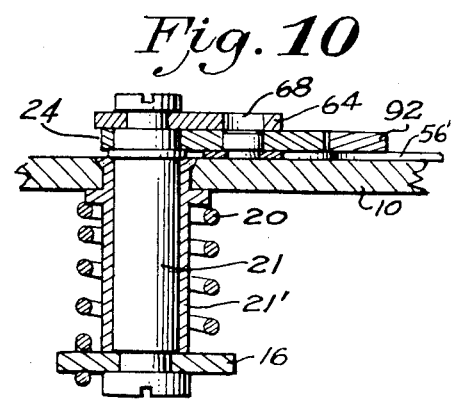
INVENTOR:
Frederick P. Willcox,
BY Homer R. Montague
ATTORNEY

United States Patent Office 2,878,735
Patented Mar. 24, 1959

2,878,735

CAMERA SHUTTER HAVING TWO SETS OF BLADES

Frederick P. Willcox, Old Westbury, N.Y., assignor to Fairchild Camera and Instrument Corporation, a corporation of Delaware Original application November 4, 1949, Serial No. 125,453, now Patent No. 2,691,331, dated October 12, 1954. Divided and this application January 26, 1952, Serial No. 268,403

3 Claims. (Cl. 95—63)

This invention relates to photography, and particularly to photographic shutters of the type especially adapted for aerial photography. This application is a division of my application Serial No. 125,453, filed November 4, 1949, entitled "Drawer Type High Speed Interlens Shutter," now Patent No. 2,691,331 of October 12, 1954.

The special operational requirements of aerial photography have in general resulted in aerial camera shutter designs which are characterized by heavy and massive constructions requiring relatively large amounts of power for operation at high shutter speeds. Since the amount of power which can conveniently be applied to the driving of shutter components is limited, such designs have in general not been capable of the maximum speeds required for use with modern films and emulsions. Also, the necessity for sudden stopping of relatively massive moving parts in these prior shutters has involved considerable shake or jar of the camera itself during exposure which is of course very detrimental to image definition, as well as possibly injurious to delicate camera and shutter parts.

Another disadvantage of many former designs of aerial camera shutters is that it has generally been necessary to remove the entire shutter and camera lense assembly from the camera when repairs or adjustments have had to be made to the shutter. In precision aerial mapping cameras, this means that the camera must be recalibrated when the lens and shutter assembly is reassembled to the camera. Such recalibration is expensive and time consuming, requires a high degree of skill and can only be accomplished in a very few laboratories. This objection is rendered more serious by the fact that the massive construction of the known aerial camera shutters, and the consequently large forces which are employed to drive the parts, render the necessity for adjustment and repair of more frequent occurrence than would be expected in the case of shutters using lighter parts and lower magnitudes of operating force.

It is consequently a principal object of the present invention to provide a photographic shutter for aerial camera use which will be constructed of parts which are in general much lighter than those heretofore employed, to provide a higher reliable maximum exposure speed by the use of relatively small operating forces.

Another object of the invention is to provide a camera shutter which will achieve the desired high speed of exposure without causing any perceptible shake of the lens components or of the camera itself, thus enabling the production of images with a high degree of definition.

Still another object of the invention is to provide an aerial camera shutter which will require only a moderate amount of driving power considering the high speeds obtained.

A further object of the invention is to provide aerial camera shutters in such form that those parts which must of necessity be located between components of the lens assembly can be slipped laterally in and out of said lens assembly as a unit, without the necessity for disturbing the lens assembly. This "drawer" construction makes it possible to remove the complete shutter for adjustment or repair without involving any of the precision optical work involved in the removal or disassembly of existing types of aerial camera shutters used with precision mapping lenses.

Still another object of the invention is to provide a shutter of the above type with improved stopping mechanisms for the shutter driving members, which will enable these parts also to be decelerated in such a way as to eliminate shock and vibration.

An additional object is to provide an improved combined brake member and latch, especially for use where the main driving member of the shutter rotates through a complete revolution for each exposure cycle, and rotates in the same direction for successive exposure cycles.

In general, the above objects of the invention are best obtained by a shutter design utilizing two separate sets of blades, one set having the function of uncovering the optical aperture to initiate an exposure, and the other set having the function of covering said aperture to terminate the exposure, together with a positive and adjustable mechanism for accomplishing the release of the second set of blades at a predetermined time after the blades of the first set have commenced their shutter-opening movement. These parts, or at least such of them as are required to be located between the optical elements of a lens assembly, are so arranged that the axial thickness of this part of the shutter mechanism is extremely small, so that the shutter may be slipped sidewise from its operative position and removed without disturbing the optical portions of the lens assembly. At the same time, novel features of blade control linkage have been provided which are applicable to shutters having two sets of blades (as above described), and also to more conventional shutters utilizing a single set of blades.

An actual embodiment of a shutter provided with two sets of blades and utilizing these design features has been constructed and tested, and has given a maximum exposure speed of 0.9 millisecond total time, that is, the elapsed time from the commencement of the opening of the shutter aperture until its complete closure, and this shutter also has a very high optical efficiency. The effectiveness of the individual blade control mechanism considered alone, is demonstrated by the fact that a drawer type shutter having a single set of blades has given speeds of 1.5 milliseconds total time, which is much faster than any known shutter utilizing blades which reverse their direction of travel between shutter opening and shutter closing movements. Both of the shutters referred to have clear exposure apertures of 0.800 inch.

I am aware that it has heretofore been proposed to provide a camera shutter utilizing separate blades or sets of blades for the functions of uncovering and covering the exposure aperture, in order to avoid the necessity for reversing the direction of movement of a single blade or blades at some point in their movements. However, so far as I am aware it has not been proposed to utilize this principle in connection with individual blade control to provide high speed and efficiency nor in a shutter whose dimensions would enable it to be installed in the extremely limited space between the optical elements of precision mapping lens assemblies.

The above and other objects and advantages of the invention will best be understood by reference to the accompanying drawings, taken in connection with the appended specification, and illustrating a preferred shutter structure in accordance with the principles of the invention.

Figure 2:
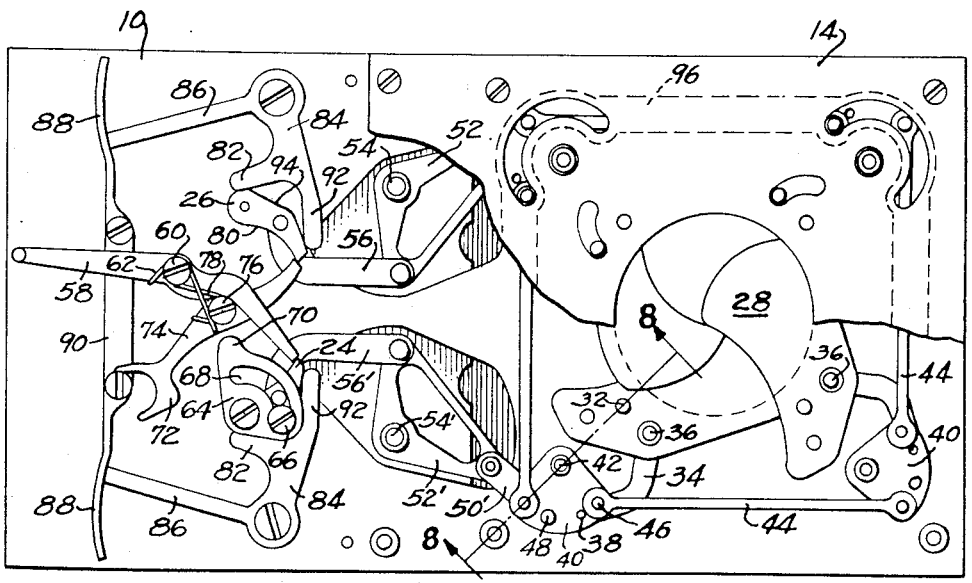
Figure 3:
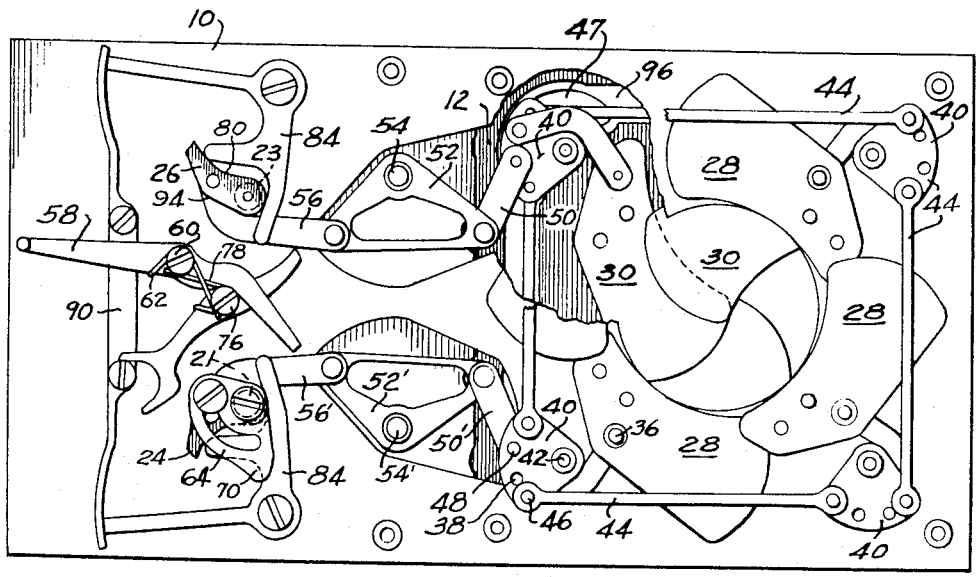
Figure 4:
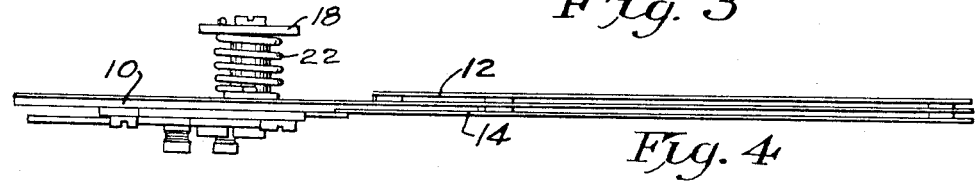
Figure 6:
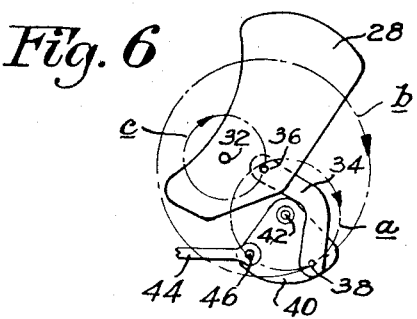
Figure 5:
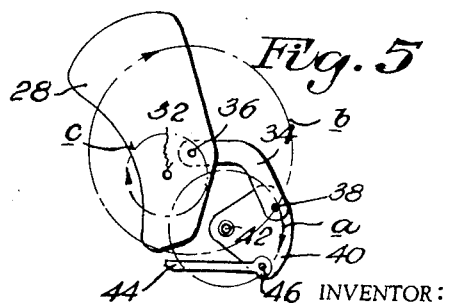

In the drawings, Fig. 1 is a plan view, partly broken away, of a drawer type shutter having two sets of operating blades controlled in accordance with the principles of this disclosure, and showing the shutter in wound condition with one set of blades closed and the other open, Fig. 2 is a view similar to Fig. 1 but looking at the shutter from the opposite direction and with other parts broken away to illustrate the drive and control linkages, the shutter also being in wound condition ready for exposure, Fig. 3 is a view looking in the same direction as Fig. 2 but with the mechanism in the run-down condition after the making of an exposure, Fig. 4 is a side elevation of the same shutter showing the relative thinness of the construction, Figs. 5 and 6 are diagrammatic illustrations of the relationship between cranks and links characteristic of the shutter illustrated in the drawings, Fig. 7 is an elevational view showing the shutter inserted in a typical lens assembly, Fig. 8 is an enlarged sectional view taken on line 8—8 of Fig. 2, Fig. 9 is an enlarged fragmentary view of a portion of Fig. 2, and Fig. 10 is a sectional view taken on line 10—10 of Fig. 9.

The preferred form of shutter in which I have embodied my invention is of the type utilizing two separate sets of blades lying closely adjacent one another, and so arranged that the exposure is commenced by the opening of one (normally closed) set of these blades, while the exposure is terminated by the closure of the second (normally open) set of blades. The expressions "normally open" and "normally closed" are used here and throughout the description in reference to the two sets of blades as they stand when the shutter is in wound condition ready for an exposure. By this means, the time ordinarily required for the reversal of movement of a single set of blades in going from opening to closing phases can be reduced to as small a value as desired.

Referring now particularly to Figs. 1 to 4 and 8 of the drawings, the shutter illustrated therein is of the type having two complete superposed sets of pivotally mounted blades. The individual drive and control mechanisms for these sets are brought out laterally from the area occupied by the blades themselves, so that the thickness of the area which must of necessity lie within the lens assembly is reduced to the minimum. The desirability of this feature of the invention is well shown in Fig. 7 of the drawings, which illustrates in sectional view a portion of a conventional and well known mapping lens assembly designated generally by the reference letter L, two of the optical lens elements themselves being designated by letters E and F. This lens mount is provided with a slot designated S in the drawings into which the shutter blade portion of the shutter must be installed, the same being guided into place by guides integral with or affixed to portions of the lens mounting parts. In a particular lens assembly of this type, the clear space between the cells of lens elements E and F is of the order of 0.10 inch, and in order to permit the slidable insertion and removal of the shutter without disassembly of the lens cells from the mounting, the maximum axial thickness of the part of the shutter passing between the cells is necessarily somewhat smaller than this dimension. It is to be understood, however, that the features of the present shutter which achieve this unusual thinness do not limit the same to a slip-in installation, as the shutter presents numerous other features of construction and operation which are desirable in any highspeed, high efficiency application.

In the interest of economy of manufacture, the parts pertinent to the two sets of blades, such as the blades themselves, the motion transmitting members and the links, are duplicated for the two sets of blades. For this reason, in reading the accompanying drawings it is very difficult to distinguish between the parts relating to the "normally open" and the "normally closed" shutter assemblies on the basis of their appearance. A complete understanding of the construction will be facilitated by bearing in mind that the parts relating to the respective blade assemblies are mounted in the respective spaces between a series of three flat plates arranged in superposed relation, and provided with the necessary cut-outs or recesses necessary to accommodate the parts with adequate clearances. This construction is best illustrated by the side elevational view of Fig. 4 and the sectional view of Fig. 8, in which numeral 10 designates the main or central support plate, while numerals 12 and 14 respectively designate the cover plates. The set of blades occupying the space between the main plate 10 and the upper plate 12, and its accompanying parts, will be referred to hereinafter as the normally open set of blades, this normally open set of blades being the set which is normally held open when the shutter is in wound condition; the blades of the other set are normally closed, and during an exposure the blades of this latter set are opened and the blades of the other set are closed in timed relation to the opening of the normally closed set to produce the complete cycle of operations, after which the shutter is rewound in preparation for a following exposure.

Bearing in mind that Figs. 1 and 2 both show the shutter in wound condition, but looking at the assembly from opposite faces, it will be observed that the winding arms or lugs 16 and 18 are each provided with a power spring designated 20 and 22 respectively, one end of each spring engaging the arm or lug and the other being held by a fixed pin on the main plate 10. These winding lugs are secured to shafts 21 and 23 passing through suitable bosses secured to the plate 10, and each shaft carries on the underside of the plate 10 a latchable crank member, these being designated 24 and 26. As best shown in Fig. 10, which is a fragmentary sectional view taken through winding lug 16, the latter may be secured to a squared portion of shaft 21 as by a screw, the shaft passing through boss 21' which is secured to plate 10, and said shaft having fixed on its lower end the latchable crank 24. The details of construction of the other spring and winding lug assembly are similar and will be clearly understood from the showing in Fig. 10 and the above description.

The blades constituting the normally closed set are indicated by numeral 28, while the blades constituting the normally open set are designated 30. Referring particularly to Fig. 1, the blades 30 are respectively pivoted on the main plate 10 as at 32, and each is arranged to be driven about its pivot through the agency of a cranked or bent link 34 having at one end a pin 36 pivotally engaging in a driving hole in the blade, and having its opposite end pivoted as at 38 to a crank fan or motion transmitting member 40. There is one of these fans 40 for each of the blades in each set, and each fan is preferably of approximately triangular shape pivoted adjacent one of its vertices upon the main plate 10 as at 42. In the present embodiment, each set of shutter blades comprises four blades, and the fans corresponding to these blades are connected in series by means of links 44 whose apertured ends are pivoted as at 46 adjacent the remaining vertices of the fans. It will be seen that each shutter blade is provided with an additional driving hole 46a located symmetrically with reference to the pivot axis 32 of the blade, this hole being provided to enable a single blade configuration to be used for both the normally open and normally closed set of blades. One fan of each set has an additional aperture 48 at which is pivotally connected the link 50 which transmits the driving power to the entire set (see Fig. 1), and the other fans of each set may likewise have this aperture in the interest of manufacturing duplicate parts; this extra aperture in each of the other fans is merely surplusage insofar as operation of the shutter is concerned.

Each set of blades has its own drive mechanism, and the drive mechanisms are substantially identical except for differences to be noted. Referring again to Fig. 1, the particular fan crank 40 appearing at the lower left portion of the upper cover plate 12 receives pivotally in its aperture 48 a pin secured to one end of a short link 50 pivoted in turn to the bell crank 52 pivoted at 54 (see Fig. 2) on the main plate 10. Referring now to Fig. 3, a bent or cranked connecting link 56 is pivoted to the other end of bell crank 52 and to the latchable crank 26 driven by power spring 22 through shaft 23. Fig. 2 illustrates the parts in latched condition, looking at the underside of Fig. 1 and with lower cover plate 14 broken away. The normally closed set of blades 28 is provided with crank fans, cranks and connecting links which are duplicates of those just described, one of the fans being connected by a short link 50' to a bell crank 52' pivoted at 54' on plate 10 and driven through a cranked connecting link 56' pivoted to the latchable crank 24 driven by power spring 20. Latchable crank 24 is held in its wound position by one end of a manual trip lever 58 pivoted at 60 on the main support plate and normally held in latching position by a suitable spring 62. Crank 24 carries a tripping member 64 (see especially Fig. 9) rotatable about the pivot axis of the crank and arranged to be held in adjusted position thereon by a screw 66 passing through an arcuate slot 68 and threaded into the body of the crank.

A rounded nose 70 on tripping member 64 is arranged so that upon release of crank 24 the nose will ultimately smoothly engage a nose 72 on a secondary release lever 74 pivoted to the main support plate at 76, and whose opposite end is normally held in latching engagement with crank 26 by means of a spring 78. Thus, operation of trip lever 58 releases crank 24 to initiate opening movement of blades 28, and at some later time determined by the adjustment of tripping member 64, the spring tension, and the delay introduced by any time control mechanism which may be provided, crank 26 is released to permit closing of the other set of blades 30. Each of the cranks 24 and 26 has a curved concave edge 80 arranged gradually to engage a slightly resilient nose 82 on a braking lever 84 pivoted on the main support plate, the arm 86 of each such lever being in frictional engagement with one spring arm 88 of a brake plate 90 also secured to the plate 10. In order to restore the braking levers 84 to their previous positions when the shutter is rewound, each such lever is provided with an additional arm 92 positioned to be engaged by the back edges 94 of the cranks 24 and 26 during the rewinding movement. The construction just described produces a smooth, vibrationless stop for the main driving cranks and permits them to be decelerated very rapidly without perceptible shock which might affect the quality of an image produced by the exposure.

It will be observed from the above description that the shutter employs two complete and separate sets of shutter blades, and a separate driving mechanism for each of these sets of blades, the mechanism of one set being tripped in predetermined relation to the operation of the other. That is, there is no transmission of operating power from one driving mechanism to the other, and since the tripping time of the blade set last operated is determined in an unvarying (but adjustable) manner in accordance with the actual position of member 64, which position is in turn precisely related to the degree of opening of blades 28, all possibility of tripping of the second set of blades at an improper time is eliminated. This system of independent application of operating power, under the control of member 64, to the "closing" blades, is to be distinguished from systems in which one set of blades receives power from the other, or in which the two sets are independently tripped from some common control.

Links 44 operate in clearance grooves designated 96 and shown in dotted lines in Fig. 2, and by solid lines in the broken away portion of Fig. 3, these grooves being machined or otherwise formed in the inner surfaces of the two cover plates 12 and 14. The shutter blades themselves are pivotally mounted upon opposite sides of the main or central support plate 10, which is itself partly broken away in Fig. 3 to show the relationship of one set of blades to the other as well as to the drive linkages. Each of plates 12 and 14 (the former as shown in Fig. 1) is provided with an arcuate clearance slot 47 (see also Fig. 8) to receive the link pivot pins 46 pertaining to each fan 40. An arcuate clearance slot 49 is also provided in each cover plate to receive the end of each pin 36 connecting a link 34 to its corresponding shutter blade.

No particular timing mechanism for the control of the release of the second set of blades in timed relation to the first set has been described herein, since such mechanism may be provided in accordance with any desired range of shutter speeds. Similarly, the mechanism for transmitting power to the winding arms or lugs has not been illustrated, also for the reason that the particular arrangements provided are dictated by the special requirements of each application. It is to be understood that this winding mechanism for controlling the operation of the winding lugs 16 and 18 may take any form so long as it provides for the closure of the open set of blades prior to the opening of the closed set of blades, in order to cap the shutter and prevent exposure of film during the rewinding operation. That is, at the completion of an exposure, with the parts in their Fig. 3 positions, blades 30 are closed and blades 28 are open. To restore the shutter to its wound condition, as in Fig. 1, without exposure of film, all that is necessary is to wind lug 16 (and shaft 21) completely, to close blades 28 prior to the rewinding of lug 18 and shaft 23 to such a position as would open blades 30. When both power springs 20 and 22 have been fully wound, the shutter is ready for the next exposure.

Referring specifically to Fig. 5, it will be seen that at the start of the opening movement of blade 28, the direction of pull of link 34 is approximately perpendicular to the radius drawn from the center of blade rotation 32 to the link connection 36, so that a given movement of link 34 produces a substantial rotation of blade 28. Also, the direction of movement of link 34 lies at a very substantial angle to the radius from the center of fan rotation 42 to connection point 38, so that a given movement of fan 40 produces a relatively large movement of link 34. Again, the direction of movement of link 44 (which is the direction of its length) makes a substantial angle with a radius from the center of fan rotation 42 to connection point 46. In other words, all of these parts are arranged so that a given movement of link 44 at the starting phase of the blade movement will result in the maximum angular rotation of said blade 28.

Referring now to Fig. 2, which also shows the blades 28 in the positions they occupy at the start of the opening movement, it will be noted that the point of connection of crank 52' with link 50' is slightly to one side of a line connecting point 48 and point 54' or slightly off dead center; this arrangement has been found to produce a higher acceleration of the blades 28 at the beginning of their opening movement than if these points were in alignment. Also, still referring to Fig. 2, the point of connection between bent lever 56' and crank 24 is in alignment between the point of connection of bent lever 56' to crank 52' and the center of rotation of latchable crank 24, so that here again the initial movement of crank 24 transmits only a small movement to bent lever 56', but with the application of a large amount of force. The overall result of these arrangements is to produce a very rapid opening movement of blades 28.

Fig. 6 illustrates diagrammatically the shutter and link relationship near the completely opened position of blades 28. Point 38 has moved into its dead center position in alignment with points 42 and 36. Therefore, small movements of link 44 and fan 40 will contribute practically no motion to blade 28, and this complete reversal of transmission ratio not only provides a smooth stopping of the blade without any danger of damaging the parts, but it also insures against rebound of the blade even if link 44 should suffer slight rebound movement. Another way of looking at Fig. 6 is to consider that at the termination of the opening movement of blade 28, pivot point 38 lies practically at the point of common tangency of circles $a$ and $b$, so that motion of point 38 about point 36 contributes practically no movement to the blade. Also, by referring to dash line circle $b$ in Fig. 5, which represents the path of pivotal movement of connection 38 about its center of rotation 36 (which also rotates in the same direction as indicated by dash line circle $c$), it is apparent that pivot 36 is brought as close to pivot 42 as possible to bring circle $b$ into common tangency with circle $a$ which is the condition shown in Fig. 6. The significance of this last fact is that as the parts approach their stopped position, link 34 contributes very little movement to blade 28, and the combination of all these relationships produces the "super-control" of the shutter blades during stopping that is responsible for the absence of destructive forces and of shake and vibration which would otherwise result if attempt were made to accelerate and decelerate known blade linkages to produce the speeds obtained with the present shutter.

Referring again to Fig. 3, it will also be noticed that upon the completion of the opening movement of blades 28, the crank 24 has moved substantially 180° from its Fig. 2 position, and the points of connection of bent arm 56' with crank 24 and crank 52' are again practically in alignment with the center of rotation of crank 24 and on dead center. Thus, slight movements of crank 24 will produce very little movement of crank 52', this feature contributing smooth stopping of the links 44 and fans 40, which have already brought the blades practically to a halt.

While the invention has been disclosed herein in connection with certain preferred embodiments thereof, it is to be understood that the principles thereof may be applied to shutters of other types and constructions, and that the details of construction may be widely varied without departing from the spirit of the invention as defined in the appended claims.

I claim:

1. A camera shutter comprising two sets of pivoted blades with the blades of said respective sets lying in closely adjacent planes, means interconnecting the blades of each set for conjoint motion, a power spring individual to each set of blades, a chain of link elements including a latch individually connecting each of said respective power springs to the blades of corresponding sets, the corresponding link elements of each chain lying in common planes, a release lever movable to selectively hold one of said latches against rotation, and a secondary release lever normally holding the other latch and movable by said one latch to release said other latch, said release levers lying substantially in the same planes occupied by said link elements.

2. A camera shutter in accordance with claim 1, in which said chains of link elements extend in directions generally parallel to one another and lying to one side of the general region occupied by said sets of blades.

3. A camera shutter in accordance with claim 1, in which each of said latches includes a cam surface, a bifurcated braking lever embracing each latch, said braking levers lying in a common plane and a frictional member engaging a portion of each braking lever, whereby to effect a braking action on each latch during a selected portion of its rotation.

References Cited in the file of this patent
UNITED STATES PATENTS

| | | |
|---|---|---|
| 1,274,262 | Gruss | July 30, 1918 |
| 1,377,366 | Rose | May 10, 1921 |
| 1,861,257 | Barenyi | May 31, 1932 |
| 2,195,330 | Hineline | Mar. 26, 1940 |
| 2,344,382 | Aiken | Mar. 14, 1944 |
| 2,441,675 | Simmon et al. | May 18, 1948 |
| 2,463,206 | Robertson | Mar. 1, 1949 |
| 2,522,698 | Willcox | Sept. 19, 1950 |
| 2,525,099 | Kimble | Oct. 10, 1950 |